Dec. 18, 1962 D. E. SINGELMANN 3,068,719
MECHANICAL DRIVE

Filed Aug. 11, 1961 2 Sheets-Sheet 1

INVENTOR.
BY DIETRICH E. SINGELMANN
ATTORNEY

Dec. 18, 1962   D. E. SINGELMANN   3,068,719
MECHANICAL DRIVE

Filed Aug. 11, 1961   2 Sheets-Sheet 2

INVENTOR.
DIETRICH E. SINGELMANN
BY
Bean, Brooks, Buckley + Bean
ATTORNEY

United States Patent Office 3,068,719
Patented Dec. 18, 1962

3,068,719
MECHANICAL DRIVE
Dietrich E. Singelmann, Buffalo, N.Y., assignor to Bell
Aerospace Corporation, Wheatfield, N.Y.
Filed Aug. 11, 1961, Ser. No. 130,867
5 Claims. (Cl. 74—640)

This invention relates to mechanical movements and, more particularly, relates to means for effecting a difference in rotational speed between a driven and driving shaft.

There are numerous instances in which it is desirable to achieve a substantial difference in rotational speed between two shafts without the necessity of employing complex or bulky gearing systems and wherein the power transmitted is of relatively large order. Whereas prior art systems of this nature are admirably suited for achieving relatively high ratios, specifically about 1 to 60 and higher, it is frequently necessary and desirable to achieve lower ratios. Specifically, the present invention contemplates ratios as low as 1 to 4 and upwards to the above specified 1 to 60 ratio representing the practical lower limit for known prior art devices.

Of primary concern in connection with the present invention, then, is the provision of a simplified drive mechanism capable of effecting low drive ratios, particularly as specified above, without the use of conventional gear reduction systems.

Essentially, the present invention contemplates the achievement of the above object by the utilization of a flexible belt or loop of chain which is so constructed as to provide both internal and external tooth elements and wherein the connection thereto, with the two shafts between which drive is transmitted, is such as to employ the articulation or flexibility of the chain loop in a fashion to establish separate and spaced portions of the chain which are subjected to tension whereas the intervening portions are in slack condition. The alternate tensioned and slackened portions of the chain loop are effected by the driving connections between the chain loop and the respective shafts and create an angular force imbalance so as to cause the rotation of one shaft in response to rotation of the other. The value of gear ratio between the two shafts is then determined by the relationship between toothed elements of the chain loop and a stationary ring gear.

Other objects and advantages of the invention will appear from the description hereinbelow and the accompanying drawings wherein.

Figure 1:
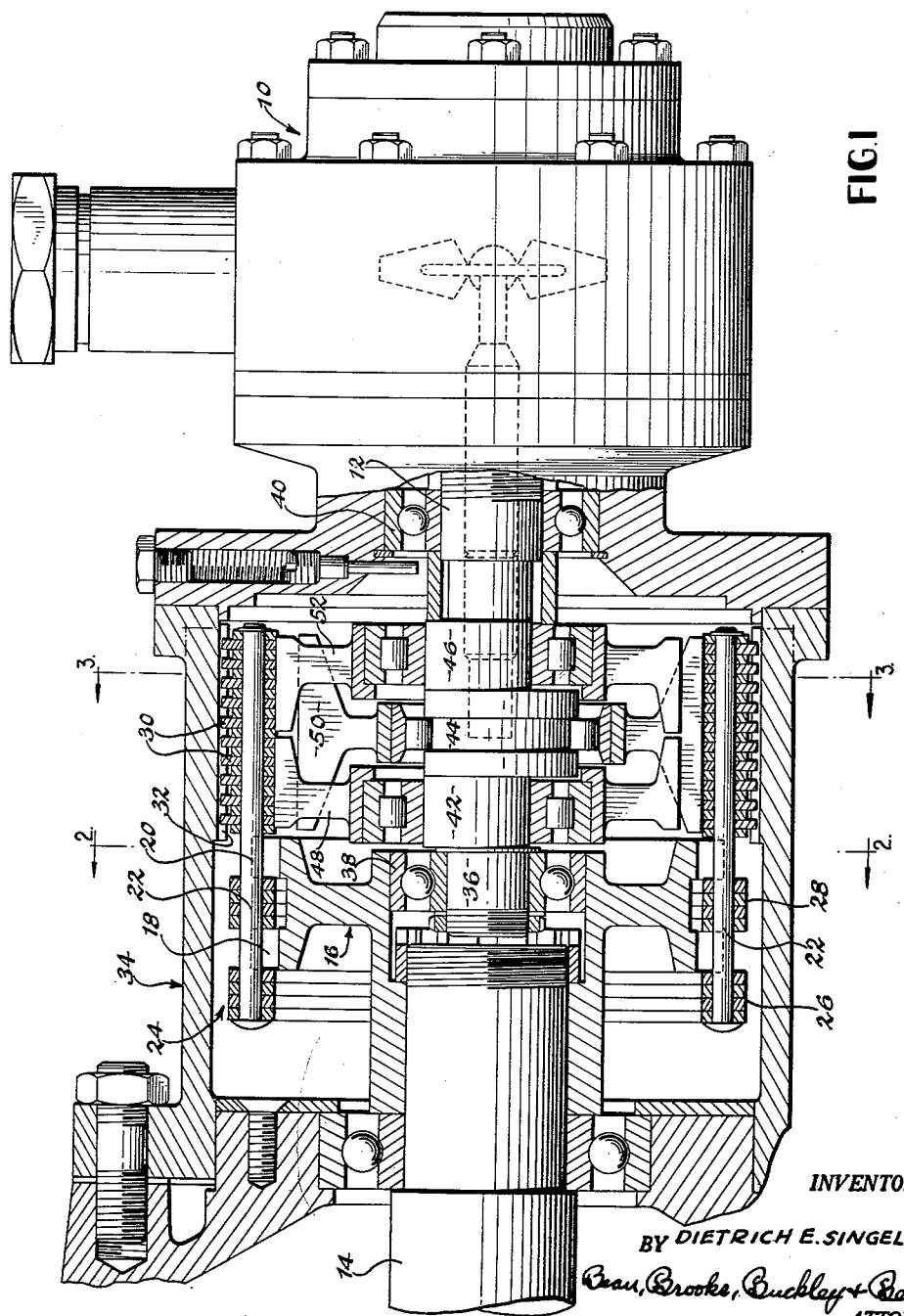
FIG. 1 is an elevational view, partly in section, showing a practical embodiment of the invention.

Referring now more particularly to FIG. 1, the assembly shown therein, it will be understood, forms but one practical embodiment and application of this invention. In this particular case, the drive is to be associated with a subsurface aquatic vehicle which employs the propulsion effect of the discharge of a high capacity, high speed pump 10 as its motivating power. The pump shaft is indicated by reference character 12 and will be understood to be rotating at a higher speed than drive shaft 14.

Drive shaft 14 is provided with a sprocket 16 suitably feathered or otherwise secured thereto and, as shown, this sprocket is provided with two rows of teeth, 18 and 20. The sprocket teeth are adapted to mesh with the link pins 22 of a chain belt or loop indicated generally by reference character 24 which are exposed for this purpose between and beyond a pair of bands of individual links 26 and 28 which are themselves articulately joined by the link pins 22. Beyond the sprocket 16, the chain loop is provided with a relatively wide band of externally toothed links 30 which are likewise articulately joined by link pins 22 and whose teeth are adapted to cooperate with the teeth 32 of a fixed ring gear. In the instance shown, the ring gear is formed integrally with the stationary housing member 34.

The pump or driven shaft 12 has one end 36 journalled, by bearing 38, within the hub of sprocket 16 and further bearing means, such as bearing 40, serve to properly support and locate this shaft. The pump shaft 12 is provided with three eccentric portions 42, 44 and 46 of which two, 42 and 46, are on coaxial centers and of which the other, 44, is displaced diametrically, or 180°, therefrom. Journalled on these eccentrics are the spider assemblies 48, 50 and 52 which are concentric with their respective eccentrics and which are provided with radial arms bearing against the inner face of the links 30 of the chain loop.

Figure 2:
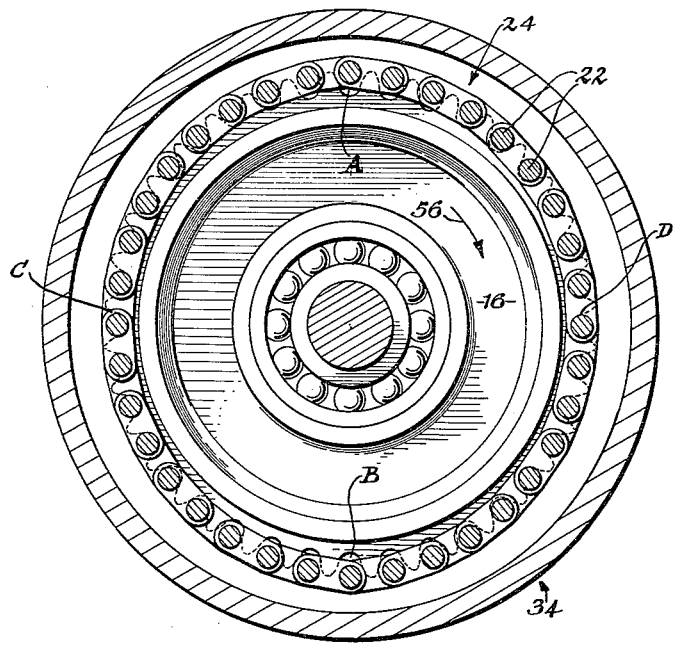
FIG. 2 is a vertical section taken along the plane of section line 2—2 in FIG. 1 illustrating the engagement between the chain loop and the driving sprocket.
Figure 3:
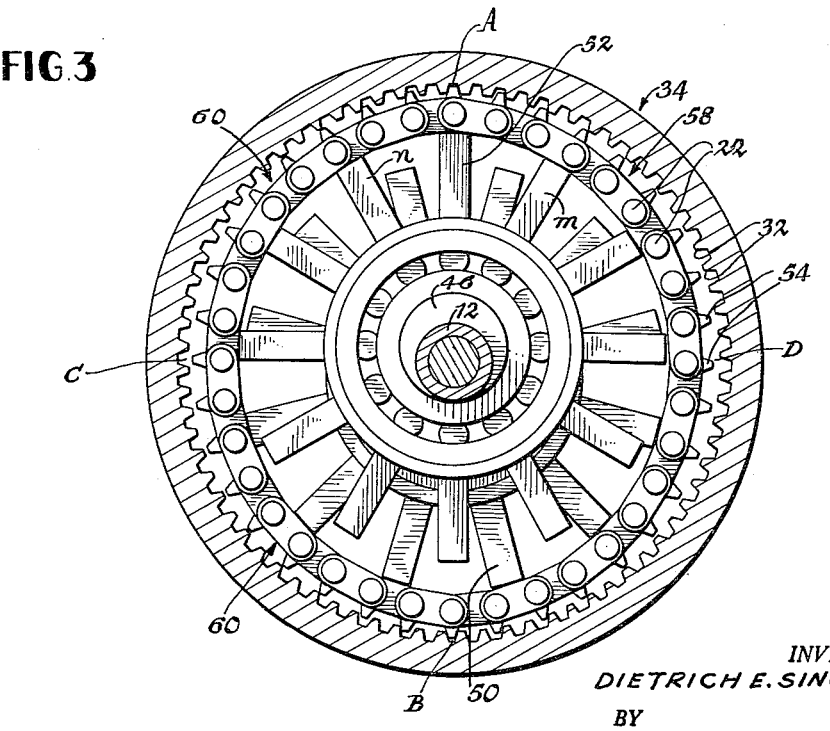
FIG. 3 is a vertical section taken along the plane of section line 3—3 in FIG. 1, showing the engagement between the eccentric spiders and the chain loop as well as the connection between the chain loop and the stationary ring gear.

Referring now to FIG. 3, it will be seen that the arms of the spiders 48, 50 and 52 are of such length as to mesh the teeth 54 of links 30 with the ring gear teeth 32 at diametrically opposed points A and B, thus permitting the chain loop to assume the shape, generally, of an ellipse whose major axis lies along such points A and B. At the same time, it will be appreciated that the pitch of link pins 22 is greater than the pitch of the sprocket teeth 18 and 20 so as to allow the chain belt to assume this shape. This is more readily seen in FIG. 2 wherein the chain belt 24 will be seen to be bottomed with the sprocket teeth only at points C and D and being most remote from such relation at the aforementioned points A and B.

It will be noted, also, that the effective number of teeth 54 is less than the number of teeth 32 on the ring gear. The over-all ratio between shafts 12 and 14 is expressed as $$\frac{N}{N-n}$$

where N is the number of teeth 32 on the ring gear and n is the effective number of teeth 54 on the chain loop. In the specific embodiment shown, only half as many teeth 54 are used so that the thirty-six teeth shown are effectively seventy-two. The ring gear is shown as having seventy-six teeth, so that the drive ratio between shafts 12 and 14 is seventy-six divided by seventy-six less seventy-two, or 19 to 1.

Thus, if the sprocket 16 is rotated in the direction of arrow 56 in FIG. 2, the chain loop 24 will be subjected to tension between the points D and A and between the points C and B while the portions of the chain loop will be slackened between points A and C and between points B and D. This will be only an instantaneous condition, however, since the aforementioned tension-slack relation will immediately cause rotation of shaft 12 and consequent displacement of all the points aforesaid.

To appreciate this, reference is had to FIG. 3. In this figure, the tensioned condition of the chain loop portions 58 between A and D and the simultaneous slack condition of portion 60 between A and C will cause counterclockwise rotation of shaft 12 (opposite in direction to sprocket 16 rotation) because the spider arm *m* is subjected to greater radial compression than is the spider arm *n*. Similarly, the spider 50 will operate to impart counterclockwise rotation of shaft 12. At the same time because the points A and B have been shifted counterclockwise, net motion of the chain loop 24 will be clockwise due to the disparity in the effective number of teeth on the chain loop and of the ring gear teeth 32.

Thus, the relative positional integrity of the points A, B, C and D will be maintained, albeit their motion will be in the counterclockwise direction. The same operational aspects are present when the drive is reversed, that is, by driving the shaft 12.

Therefore, the essence of the present invention involves the maintenance of the relative positionel integrity of several points as aforesaid between which alternate slack and tension portions of a linked member or chain loop are established. This, coupled with the disparity between the number of teeth 32 on the ring gear and the effective number of teeth 54 on the chain loop, establish the mode of operation.

It is to be understood that certain changes and modifications in the structure as illustrated and described may be made without departing from the spirit of the invention or the scope of the following claims.

What is claimed is:

1. In a drive assembly, a pair of axially aligned shafts, a sprocket fixed to one shaft, the other shaft having a pair of circumferentially displaced eccentrics, a spider journalled on each eccentric, a flexible chain loop having a plurality of internal teeth meshed with the teeth of said sprocket and of like number thereto, a fixed ring gear concentric with said shafts adn surrounding said loop, said loop having external teeth of lesser number than the teeth of said ring gear, the pitch of said internal teeth of the loop being greater than the pitch of said sprocket teeth whereby the loop is of greater length than the pitch circumference of said sprocket, said spiders being of radial length sufficient to engage the inner surface of the loop in the region of said external teeth thereof and fully engage such teeth with the ring gear only at the points of maximum eccentricity, whereby the loop is fully engaged with said sprocket only at points midway between said points of maximum eccentricity.

2. A mechanical drive comprising a pair of axially aligned shafts between which drive is to be transmitted, a fixed ring gear surrounding such shafts in radially spaced relation thereto, a sprocket fixed to one of said shafts, a relatively wide chain band having internal teeth adjacent one side edge and external teeth adjacent the opposite side edge cooperable, respectively, with said sprocket and said ring gear, said internal teeth being of like number but of greater pitch than the sprocket teeth and the external teeth being of lesser number than the ring gear teeth, the other shaft having at least a pair of circumferentially displaced eccentrics, and means on said eccentrics for subjecting alternate lengths of said chain band to tension and slack upon relative rotation of said shafts to impart the drive therebetween.

3. A mechanical drive comprising a pair of axially aligned shafts between which drive is to be transmitted, a fixed ring gear surrounding such shafts in radially spaced relation thereto, a sprocket fixed to one of said shafts, a relatively wide chain band having internal teeth adjacent one side edge and external teeth adjacent the opposite side edge cooperable, respectively, with said sprocket and said ring gear, said internal teeth being of like number but of greater pitch than the sprocket teeth and the external teeth being of lesser number than the ring gear teeth, the other shaft having at least a pair of circumferentially displaced eccentrics, and means on said eccentrics for subjecting alternate lengths of said chain band to tension and slack upon relative rotation of said shafts to impart the drive therebetween, said means comprising a spider journalled on each eccentric being, in each case, of such radial extent as to fully engage said external teeth with said ring gear only at their points of maximum eccentricity.

4. A mechanical drive comprising a pair of axially aligned shafts between which drive is to be transmitted, a fixed ring gear surrounding such shafts in radially spaced relation thereto, a sprocket fixed to one of said shafts, a relatively wide chain band having internal teeth adjacent one side edge and external teeth adjacent the opposite side edge cooperable, respectively, with said sprocket and said ring gear, said internal teeth being of like number but of greater pitch than the sprocket teeth and the external teeth being of lesser number than the ring gear teeth, the other shaft having at least a pair of circumferentially displaced eccentrics, and means on said eccentrics for subjecting alternate lengths of said chain band to tension and slack upon relative rotation of said shafts to impart the drive therebetween, said band being in the form of a series of elongate hinge pins of like number to the teeth of said sprocket, said pins being joined, along said one side of the band, by a pair of spaced rows of links exposing said pins therebetween to form said internal teeth, there being a wide row of links along said other side of the band having teeth thereon forming said external teeth.

5. A mechanical drive comprising a pair of axially aligned shafts between which drive is to be transmitted, a fixed ring gear surrounding such shafts in radially spaced relation thereto, a sprocket fixed to one of said shafts, a relatively wide chain band having internal teeth adjacent one side edge and external teeth adjacent the opposite side edge cooperable, respectively, with said sprocket and said ring gear, said internal teeth being of like number but of greater pitch than the sprocket teeth and the external teeth being of lesser number than the ring gear teeth, the other shaft having at least a pair of circumferentially displaced eccentrics, and means on said eccentrics for subjecting alternate lengths of said chain band to tension and slack upon relative rotation of said shafts to impart the drive therebetween, said band being in the form of a series of elongate hinge pins of like number to the teeth of said sprocket, said pins being joined, along said one side of the band, by a pair of spaced rows of links exposing said pins therebetween to form said internal teeth, there being a wide row of links along said other side of the band having teeth thereon forming said external teeth, said means comprising a spider journalled on each eccentric being, in each case, of such radial extent as to fully engage said external teeth with said ring gear only at their points of maximum eccentricity.

References Cited in the file of this patent

UNITED STATES PATENTS 2,966,808    Grudin _____ Jan. 3, 1961

FOREIGN PATENTS 588,423    Great Britain _____ May 21, 1947